(12) United States Patent
Diemer et al.

(10) Patent No.: US 8,758,179 B2
(45) Date of Patent: Jun. 24, 2014

(54) ELECTRICALLY-VARIABLE TRANSMISSION FOR A VEHICLE

(71) Applicant: GM Global Technology Operations LLC, Detroit, MI (US)

(72) Inventors: John A. Diemer, Farmington Hills, MI (US); Pete R. Garcia, Troy, MI (US); Douglas John Dwenger, Plymouth, MI (US); Boris Burgman, Oak Park, MI (US); Robert Joseph Gonzales, Clarkston, MI (US); Kent A. Miller, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 13/657,118

(22) Filed: Oct. 22, 2012

(65) Prior Publication Data

US 2014/0113760 A1    Apr. 24, 2014

(51) Int. Cl.
*F16H 3/72* (2006.01)

(52) U.S. Cl.
USPC .............................................................. 475/5

(58) Field of Classification Search
None
See application file for complete search history.

(56) References Cited

U.S. PATENT DOCUMENTS

| | | | | |
|---|---|---|---|---|
| 5,856,709 | A * | 1/1999 | Ibaraki et al. | 290/45 |
| 7,597,648 | B2 * | 10/2009 | Conlon et al. | 477/4 |
| 2010/0179009 | A1 | 7/2010 | Wittkopp et al. | |
| 2010/0210388 | A1 | 8/2010 | Grochowski et al. | |
| 2010/0222171 | A1 * | 9/2010 | Tabata et al. | 475/5 |
| 2011/0100157 | A1 | 5/2011 | Roses et al. | |

* cited by examiner

*Primary Examiner* — Erin D Bishop
(74) *Attorney, Agent, or Firm* — Quinn Law Group, PLLC (57) ABSTRACT

An electrically-variable transmission for a vehicle is disclosed. The transmission includes an input member and an output member each rotatable about a first axis. The transmission includes a casing defining a cavity between a first end wall and a second end wall. The transmission includes a first motor/generator and a second motor/generator disposed in the cavity with a second planetary gear set disposed between the first and second motor/generators along the first axis. The transmission includes a first torque-transmitting mechanism disposed between the first and second motor/generators along the first axis. The transmission includes a second torque-transmitting mechanism disposed between the first end wall and the first motor/generator along the first axis. The first motor/generator is disposed between the first and second torque-transmitting mechanisms along the first axis. The transmission includes a damper mechanism disposed between the second end wall and a first planetary gear set along the first axis.

19 Claims, 4 Drawing Sheets

ELECTRICALLY-VARIABLE TRANSMISSION FOR A VEHICLE

TECHNICAL FIELD

The present disclosure relates to an electrically-variable transmission for a vehicle.

BACKGROUND

Electrically-variable transmissions typically have an input member, an output member, and two electric motor/generators connected to different members of planetary gear sets. Clutches allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package the two motor/generators, planetary gear sets, and multiple clutches necessary to achieve the desired modes of operation, while meeting other applicable dimensional limitations and achieving relatively simple assembly requirements. Furthermore, although electrically variable transmissions are being mass-produced today, these are installed in a small fraction of the total number of vehicles being produced today, and so engineering and tooling costs are likely to be a relatively larger portion of the total production costs as compared with the costs for other types of transmissions.

SUMMARY

The present disclosure provides an electrically-variable transmission for a vehicle. The transmission includes an input member and an output member each rotatable about a first axis. The transmission also includes a casing defining a cavity between a first end wall and a second end wall. The first and second end walls are spaced from each other along the first axis. The transmission also includes a first planetary gear set and a second planetary gear set each disposed in the cavity, and each having a sun gear, a carrier rotatably supporting a plurality of pinion gears, and a ring gear, with the pinion gears meshing with the sun gear and the ring gear of respective ones of the first and second planetary gear sets. The transmission further includes a first motor/generator and a second motor/generator disposed in the cavity and spaced from each other along the first axis such that the second planetary gear set is disposed between the first and second motor/generators along the first axis. The first motor/generator is connected for rotation with the sun gear of the first planetary gear set and the second motor/generator is connected for rotation with the sun gear of the second planetary gear set. In addition, the transmission includes a first torque-transmitting mechanism disposed in the cavity and selectively actuated to ground the ring gear of the second planetary gear set to the casing. The first torque-transmitting mechanism is disposed between the first and second motor/generators along the first axis. The transmission also includes a second torque-transmitting mechanism disposed in the cavity and selectively actuated to connect the sun gear of the first planetary gear set with the ring gear of the second planetary gear set. The second torque-transmitting mechanism is disposed between the first end wall and the first motor/generator along the first axis. Additionally, the first motor/generator is disposed between the first and second torque-transmitting mechanisms along the first axis. The transmission also includes a damper mechanism coupled to the input member and the first planetary gear set in the cavity. The damper mechanism is disposed between the second end wall and the first planetary gear set along the first axis.

The present disclosure also provides an electrically-variable transmission for a vehicle. The transmission includes an input member and an output member each rotatable about a first axis. The transmission also includes a casing defining a cavity between a first end wall and a second end wall. The first and second end walls are spaced from each other along the first axis. The transmission further includes a first planetary gear set and a second planetary gear set each disposed in the cavity, and each having a sun gear, a carrier rotatably supporting a plurality of pinion gears, and a ring gear, with the pinion gears meshing with the sun gear and the ring gear of respective ones of the first and second planetary gear sets. In addition, the transmission includes a first motor/generator and a second motor/generator disposed in the cavity and spaced from each other along the first axis such that the second planetary gear set is disposed between the first and second motor/generators along the first axis. The first motor/generator is connected for rotation with the sun gear of the first planetary gear set and the second motor/generator is connected for rotation with the sun gear of the second planetary gear set. The first and second motor/generators each include a rotor, a stator and a resolver, with the stator of the first and second motor/generators each grounded to the casing. The transmission further includes a first torque-transmitting mechanism disposed in the cavity and selectively actuated to ground the ring gear of the second planetary gear set to the casing. The first torque-transmitting mechanism is disposed between the first and second motor/generators along the first axis. The transmission also includes a second torque-transmitting mechanism disposed in the cavity and selectively actuated to connect the sun gear of the first planetary gear set with the ring gear of the second planetary gear set. The second torque-transmitting mechanism is disposed between the first end wall and the first motor/generator along the first axis. Additionally, the first motor/generator is disposed between the first and second torque-transmitting mechanisms along the first axis. The transmission further includes a damper mechanism coupled to the input member and the first planetary gear set in the cavity. The damper mechanism is disposed between the second end wall and the first planetary gear set along the first axis.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
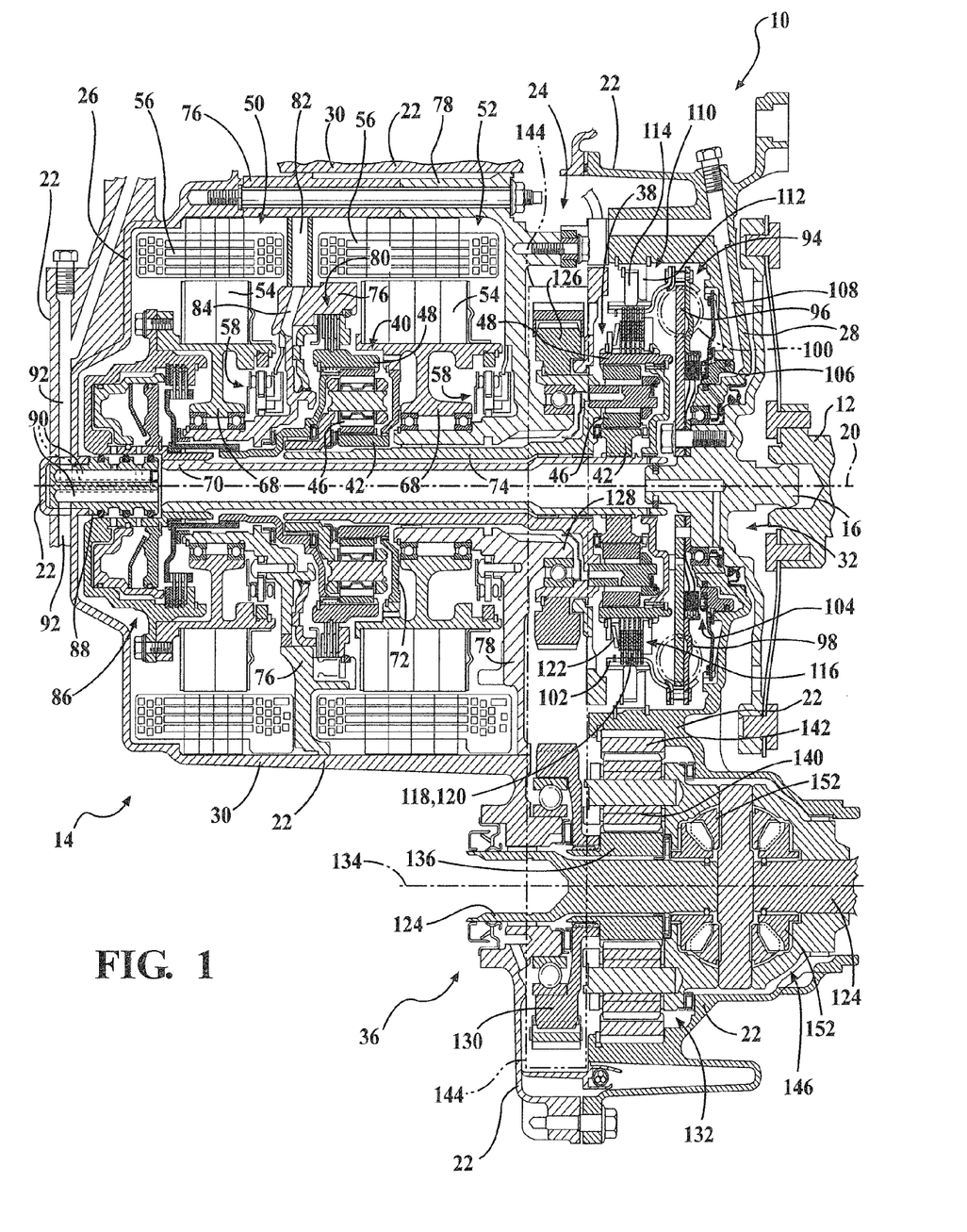
FIG. 1 is a schematic cross-sectional view of a powertrain including an electrically-variable transmission having a torque-brake mechanism and a torque-limiter mechanism.
Figure 2:
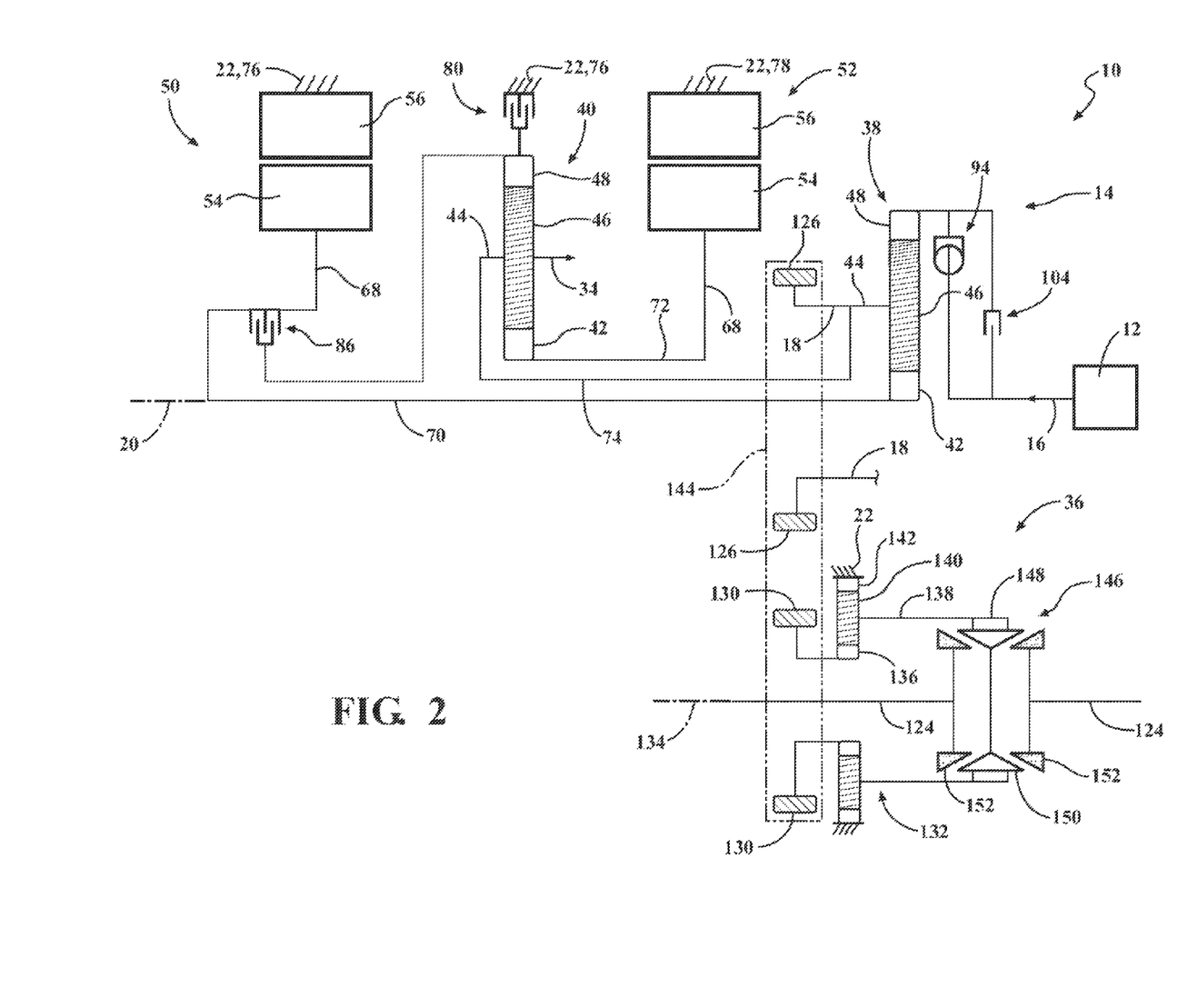
FIG. 2 is a schematic of the powertrain of FIG. 1 with the torque-brake mechanism and the torque-limiter mechanism removed.

Referring to the Figures, wherein like numerals indicate like or corresponding parts throughout the several views, a powertrain 10 for a vehicle is generally shown in FIGS. 1 and 2. The powertrain 10 includes an engine 12 and an electrically-variable transmission 14 for the vehicle. The engine 12 is drivingly connected to the electrically-variable transmission 14. The engine 12 is shown schematically in FIGS. 1 and 2 for illustrative purposes only. The electrically-variable transmission 14 can be for a hybrid vehicle or any other suitable vehicle.

Referring to FIGS. 1 and 2, the transmission 14 includes an input member 16 and an output member 18 each rotatable about a first axis 20. Specifically, the engine 12 is coupled to the input member 16 of the transmission 14 such that the engine 12 can drive the input member 16.

Turning back to FIG. 1, the transmission 14 also includes a casing 22 defining a cavity 24 between a first end wall 26 and a second end wall 28. The first and second end walls 26, 28 are spaced from each other along the first axis 20. It is to be appreciated that the casing 22 can include one or more walls 30 in addition to the first and second end walls 26, 28.

The casing 22 can define a plurality of access holes 32 for the input member 16 and the output member 18 to extend therethrough, with the access holes 32 spaced from each other. Generally, one of the first and second end walls 26, 28 defines at least one of the access holes 32 for receiving the input member 16. In one embodiment, the second end wall 28 defines at least one of the access holes 32 with the input member 16 disposed therethrough. Therefore, in certain embodiments, the input member 16 is at least partially disposed in the cavity 24 of the casing 22 through one of the access holes 32 such that part of the input member 16 is disposed in the cavity 24 and another part of the input member 16 is disposed outside of the cavity 24. Therefore, the engine 12 is coupled to the input member 16 outside of the casing 22. The input member 16, the output member 18 and the casing 22 can include various components to seal the cavity 24 at the access holes 32. The casing 22 can be referred to as a stationary member.

Referring to FIG. 2, the transmission 14 can also include at least one alternate output member 34 disposed at an alternate location in the transmission 14. All of the output members 18, 34 are interconnected to rotate commonly, i.e., at the same speed. The alternate output member 34 cooperates with one of the access holes 32 of the casing 22. The output members 18, 34 are each rotatable about the first axis 20. When utilizing more than one alternate output members 18, 34, each of the output members 18, 34 are disposed at alternate locations in the transmission 14, and therefore, the access holes 32 are spaced from each other.

Turning to FIGS. 1 and 2, the transmission 14 can also include a drive transfer assembly 36 disposed in the cavity 24 of the casing 22 and connected to one of the output members 18, 34. Furthermore, a final drive can be connected to the drive transfer assembly 36. Specifically, one of the output members 18, 34 can be connected to the final drive through the drive transfer assembly 36. Selecting which output location will serve as the output member 18 connected to the drive transfer assembly 36 will depend on packaging requirements of the powertrain 10 of the vehicle. Positioning of the drive transfer assembly 36 in the transmission 14 ensures appropriate component clearances. The drive transfer assembly 36 will be discussed further below.

The transmission 14 further includes a first planetary gear set 38 and a second planetary gear set 40 each disposed in the cavity 24. The first and second planetary gear sets 38, 40 each have a first member that is a sun gear 42, a second member that is a carrier 44 rotatably supporting a plurality of pinion gears 46, and a third member that is a ring gear 48. The pinion gears 46 mesh with the sun gear 42 and the ring gear 48 of respective ones of the first and second planetary gear sets 38, 40. In other words, the pinion gears 46 of the first planetary gear set 38 meshes with the sun and ring gears 42, 48 of the first planetary gear set 38. Similarly, the pinion gears 46 of the second planetary gear set 40 meshes with the sun and ring gears 42, 48 of the second planetary gear set 40.

Continuing with FIGS. 1 and 2, the transmission 14 also includes a first motor/generator 50 and a second motor/generator 52 disposed in the cavity 24 and spaced from each other along the first axis 20 such that the second planetary gear set 40 is disposed between the first and second motor/generators 50, 52 along the first axis 20. The first motor/generator 50 is connected for rotation with the sun gear 42 of the first planetary gear set 38 and the second motor/generator 52 is connected for rotation with the sun gear 42 of the second planetary gear set 40. Generally, the second motor/generator 52 is disposed between the first and second planetary gear sets 38, 40 along the first axis 20.

Referring to FIG. 1, the first and second motor/generators 50, 52 each can include a rotor 54, a stator 56 and a resolver 58. Generally, the rotor 54 of the first motor/generator 50 is disposed between the stator 56 and the resolver 58 of the first motor/generator 50 transverse to the first axis 20. Similarly, the rotor 54 of the second motor/generator 52 is disposed between the stator 56 and the resolver 58 of the second motor/generator 52 transverse to the first axis 20. The rotor 54 of the first motor/generator 50 is rotatable about the first axis 20 independently of the stator 56 and the resolver 58 of the first motor/generator 50. Likewise, the rotor 54 of the second motor/generator 52 is rotatable about the first axis 20 independently of the stator 56 and the resolver 58 of the second motor/generator 52. The resolver 58 of the first motor/generator 50 can determine a position of the rotor 54 of the first motor/generator 50 before, during and after rotation of this rotor 54. Similarly, the resolver 58 of the second motor/generator 52 can determine a position of the rotor 54 of the second motor/generator 52 before, during and after rotation of this rotor 54. As discussed above, the second planetary gear set 40 is disposed between the first and second motor/generators 50, 52 along the first axis 20, and more specifically, the second planetary gear set 40 is disposed between the resolvers 58 of the first and second motor/generators 50, 52. It is to be appreciated that the resolver 58 of each of the first and second motor/generators 50, 52 can be in any suitable location.

Figure 3:
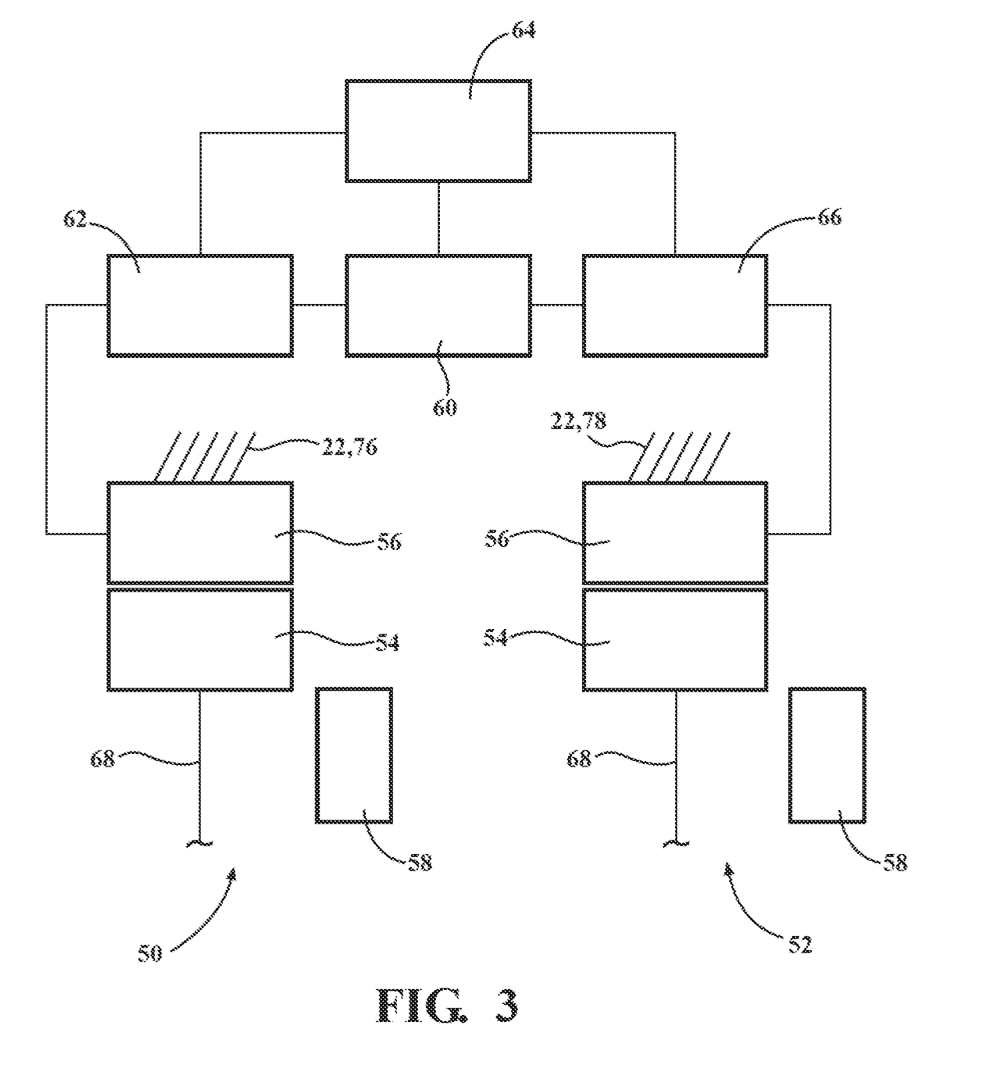
FIG. 3 is a schematic of a controller, a battery, a first motor/generator cooperating with a first power inverter and a second motor/generator cooperating with a second power inverter.

Referring to FIG. 3, the stator 56 of the first motor/generator 50 is operatively connected to a battery 60, a first power inverter 62 and a controller 64 to control the function of the first motor/generator 50 as a motor and a generator. Furthermore, the stator 56 of the second motor/generator 52 is operatively connected to the battery 60, a second power inverter 66 and the controller 64 to control the function of the second motor/generator 52 as a motor and a generator. Therefore, when the first and/or second motor/generators 50, 52 are functioning as the motor, power stored in the battery 60 is supplied to the stator 56 of the first and/or second motor/generators 50, 52. When the first and/or second motor/generators 50, 52 are functioning as the generator, torque from the rotor 54 of the first and/or second motor/generators 50, 52 rotating about the first axis 20 is converted to electrical power stored in the battery 60. The ability to control the motor/generators 50, 52 to function as the motor or the generator are well known and will not be discussed in detail herein. FIG. 3 illustrates the battery 60, the controller 64, the first and second power inverters 62, 66 and the first and second motor/generators 50, 52 schematically for illustrative purposes only.

Turning back to FIG. 1, the rotor 54 of the first and second motor/generators 50, 52 can each include a hub 68 supporting the respective rotor 54. The hub 68 of the rotor 54 of the first motor/generator 50 is connected for common rotation with the sun gear 42 of the first planetary gear set 38. Specifically, a first shaft 70 connects the hub 68 of the rotor 54 of the first motor/generator 50 with the sun gear 42 of the first planetary gear set 38 for providing common rotation of the hub 68, the rotor 54 of the first motor/generator 50 and the sun gear 42 of the first planetary gear set 38. As such, the first shaft 70 is rotatable about the first axis 20.

The hub 68 of the rotor 54 of the second motor/generator 52 is connected for common rotation with the sun gear 42 of the second planetary gear set 40. Specifically, a sleeve shaft 72 connects the hub 68 of the rotor 54 of the second motor/generator 52 with the sun gear 42 of the second planetary gear set 40 for providing common rotation of the hub 68, the rotor 54 of the second motor/generator 52 and the sun gear 42 of the second planetary gear set 40. As such, the sleeve shaft 72 is rotatable about the first axis 20.

Generally, a second shaft 74 is connected to the output members 18, 34, with the second shaft 74 rotatable about the first axis 20. Specifically, the second shaft 74 connects the carriers 44 of the first and second planetary gear sets 38, 40 to each other. Furthermore, the second shaft 74 is disposed about or surrounds the first shaft 70. One of the output members 18, 34 is connected to the carrier 44 of the first planetary gear set 38 for rotation therewith, and thus the second shaft 74. Similarly, another one of the output members 18, 34 is connected to the carrier 44 of the second planetary gear set 40 for rotation therewith, and thus the second shaft 74.

Continuing with FIG. 1, the transmission 14 can also include a first support 76 attached to the casing 22 in the cavity 24. The first motor/generator 50 is secured to the first support 76 such that the first support 76 supports the first motor/generator 50. In other words, the first motor/generator 50 is mounted to the first support 76 to define a first modular unit. Therefore, the first modular unit is attached to the casing 22 in the cavity 24. Furthermore, the rotor 54, the stator 56 and the resolver 58 of the first motor/generator 50 is coupled to the first support 76 to further define the first modular unit. As such, the first modular unit including the rotor 54, the stator 56 and the resolver 58 of the first motor/generator 50, is attached to the casing 22 in the cavity 24. More specifically, the first modular unit is attached to one of the first and second end walls 26, 28 in the cavity 24 to secure the first modular unit to the casing 22. In one embodiment, the first modular unit is attached to the first end wall 26 as shown in FIG. 1. The first modular unit provides a complete motor/generator sub-assembly which can be inserted into the cavity 24 and attached to the casing 22 as a unit. Thus, the first motor/generator 50 is arranged on the first support 76 to enhance packaging space of the first motor/generator 50. Furthermore, the first modular unit simplifies assembly of the first motor/generator 50 in the cavity 24 of the casing 22 by preassembling the first motor/generator 50 to the first support 76.

The transmission 14 can further include a second support 78 attached to the first support 76 in the cavity 24 of the casing 22 for securing the second support 78 to the casing 22. The second motor/generator 52 is secured to the second support 78 such that the second support 78 supports the second motor/generator 52. In other words, the second motor/generator 52 is mounted to the second support 78 to define a second modular unit. Generally, the first modular unit is disposed between the casing 22 and the second modular unit in the cavity 24. More specifically, as discussed above, in one embodiment, the first modular unit is attached to the first end wall 26; therefore, the first modular unit is generally disposed between the first end wall 26 and the second modular unit.

In certain embodiments, the rotor 54, the stator 56 and the resolver 58 of the second motor/generator 52 is coupled to the second support 78 to further define the second modular unit. As such, the second modular unit including the rotor 54, the stator 56 and the resolver 58 of the second motor/generator 52, is attached to the first modular unit in the cavity 24 of the casing 22. The second modular unit provides a complete motor/generator sub-assembly which can be inserted into the cavity 24 as a unit. Thus, the second motor/generator 52 is arranged on the second support 78 to enhance packaging space of the second motor/generator 52. Furthermore, the second modular unit simplifies assembly of the second motor/generator 52 in the cavity 24 of the casing 22 by preassembling the second motor/generator 52 to the second support 78. In addition, the second modular unit is attached to the first modular unit such that the first and second modular units align with each other along the first axis 20 in the cavity 24 of the casing 22. Therefore, the first and second modular units can be inserted into the cavity 24 through the same side of the casing 22 to align the first and second modular units in the cavity 24. Aligning the first and second modular units along the first axis 20 enhances packaging space of the first and second motor/generators 50, 52 in the cavity 24 of the casing 22.

Generally, the stator 56 of the first motor/generator 50 is grounded to the casing 22. In certain embodiments, the stator 56 of the first motor/generator 50 is grounded to the casing 22 through the first support 76. Furthermore, generally, the stator 56 of the second motor/generator 52 is grounded to the casing 22. In certain embodiments, the stator 56 of the second motor/generator 52 is grounded to the casing 22 through the second support 78. It is to be appreciated that the stator 56 of the second motor/generator 52 can be grounded to the casing 22 through the first and second supports 76, 78.

Referring to FIGS. 1 and 2, the transmission 14 also includes a first torque-transmitting mechanism 80 disposed in the cavity 24 and selectively actuated to ground the ring gear 48 of the second planetary gear set 40 to the casing 22. More specifically, the first torque-transmitting mechanism 80 is coupled or attached to the first support 76; therefore, selectively actuating the first torque-transmitting mechanism 80 to ground the ring gear 48 of the second planetary gear set 40 to the casing 22 is further defined as selectively grounding the ring gear 48 of the second planetary gear set 40 to the casing 22 through the first support 76. Generally, the first torque-transmitting mechanism 80 is disposed between the first and second motor/generators 50, 52 along the first axis 20. More specifically, the first torque-transmitting mechanism 80 is disposed between the resolver 58 of the first motor/generator 50 and the rotor 54 of the second motor/generator 52 along the first axis 20.

Furthermore, in certain embodiments, the first torque-transmitting mechanism 80 is disposed radially outward of one of the first and second planetary gear sets 38, 40 relative to the first axis 20. More specifically, in one embodiment, the first torque-transmitting mechanism 80 is disposed radially outward of the second planetary gear set 40 relative to the first axis 20. As such, the first torque-transmitting mechanism 80 generally aligns with the ring gear 48 of the second planetary gear set 40 transverse to the first axis 20.

As shown in FIG. 1, a tube 82 can be disposed between the first and second motor/generators 50, 52 to cooperate with the first torque-transmitting mechanism 80. More specifically, the tube 82 can extend between the stator 56 of the first and second motor/generators 50, 52 to cooperate with the first torque-transmitting mechanism 80 for supplying or guiding fluid to the first torque-transmitting mechanism 80. Furthermore, the first support 76 can define an aperture 84 in fluid communication with the tube 82 and the first torque-transmitting mechanism 80 for supplying or guiding the fluid to the first torque-transmitting mechanism 80.

The first torque-transmitting mechanism 80 can be defined as a first clutch. The first clutch can be a stationary-type clutch or any other suitable type of clutch. The stationary-type clutch can also be referred to as a brake clutch. It is to be appreciated that the first torque-transmitting mechanism 80 can be any suitable configuration.

Referring to FIGS. 1 and 2, the transmission 14 further includes a second torque-transmitting mechanism 86 disposed in the cavity 24 and selectively actuated to connect the sun gear 42 of the first planetary gear set 38 with the ring gear 48 of the second planetary gear set 40. More specifically, the second torque-transmitting mechanism 86 is actuated to connect, for common rotation, the sun gear 42 of the first planetary gear set 38 with the ring gear 48 of the second planetary gear set 40. Generally, the second torque-transmitting mechanism 86 is disposed between the first end wall 26 and the first motor/generator 50 along the first axis 20. Furthermore, the first motor/generator 50 is disposed between the first and second torque-transmitting mechanisms 80, 86 along the first axis 20. In addition, the first motor/generator 50 is disposed between the second planetary gear set 40 and the second torque-transmitting mechanism 86 along the first axis 20.

As shown in FIG. 1, a guide member 88 can be secured or attached to one of the walls 26, 28, 30 along the first axis 20 to cooperate with the second torque-transmitting mechanism 86. More specifically, in certain embodiments, the guide member 88 is secured or attached to the first end wall 26 for supplying or guiding fluid to the second torque-transmitting mechanism 86 and at least one other component of the transmission 14, such as a gear box, a bearing, etc.

The guide member 88 defines a plurality of paths 90 in fluid communication with the second torque-transmitting mechanism 86 and the first shaft 70 for supplying or guiding the fluid to the second torque-transmitting mechanism 86 and the at least one other component of the transmission 14. The fluid is supplied or guided through the first end wall 26, into respective paths 90 of the guide member 88, and out to the second torque-transmitting mechanism 86 and the first shaft 70. Therefore, the casing 22 defines a plurality of channels 92 cooperating with respective paths 90.

The second torque-transmitting mechanism 86 can be defined as a second clutch. The second clutch can be a rotating-type clutch or any other suitable type of clutch. It is to be appreciated that the second torque-transmitting mechanism 86 can be any suitable configuration.

A first forward-mode of operation is established by activating or engaging the first torque-transmitting mechanism 80 and deactivating or disengaging the second torque-transmitting mechanism 86. This mode of operation is an input-split operating mode, with the first planetary gear set 38 operating in a differential mode and the second planetary gear set 40 operating in a torque-multiplication mode, with the engine 12 providing torque and the first motor/generator 50 motoring in a forward direction. A reverse electrically-variable operating mode is established with the same activation of the first torque-transmitting mechanism 80 and deactivation of the second torque-transmitting mechanism 86 but with the first motor/generator 50 motoring in a reverse direction.

A second forward-mode of operation is established by activating or engaging the second torque-transmitting mechanism 86 and deactivating or disengaging the first torque-transmitting mechanism 80. The shift between modes occurs when the speed of the rotor 54 of the first motor/generator 50 is zero and the speed of the ring gear 48 of the second planetary gear set 40 is also zero (due to the engagement of the first torque-transmitting mechanism 80), so that the shift can occur without torque disturbance. A fixed forward-speed ratio is established by engaging both of the first and second torque-transmitting mechanisms 80, 86.

In addition, referring to FIGS. 1 and 2, the transmission 14 includes a damper mechanism 94 coupled to the input member 16 and the first planetary gear set 38 in the cavity 24. Generally, the damper mechanism 94 is disposed between the second end wall 28 and the first planetary gear set 38 along the first axis 20. The input member 16 is connected for common rotation with the ring gear 48 of the first planetary gear set 38 through the damper mechanism 94.

Referring to FIG. 1, the damper mechanism 94 can include a plate 96 attached to the input member 16 and a cage 98 disposed about the plate 96. Furthermore, the cage 98 is coupled to the plate 96 and the ring gear 48 of the first planetary gear set 38. The cage 98 and the plate 96 are coupled to each other such that relative movement between the cage 98 and the plate 96 is allowed during running of the engine 12 and prevented when starting the engine 12 as discussed further below. It is to be appreciated that the damper mechanism 94 can include other components, such as, for example, a plurality of isolator springs 100 coupled to the plate 96 and the cage 98 to dampen relative movement between the plate 96 and the cage 98 when running the engine 12.

Figure 4:
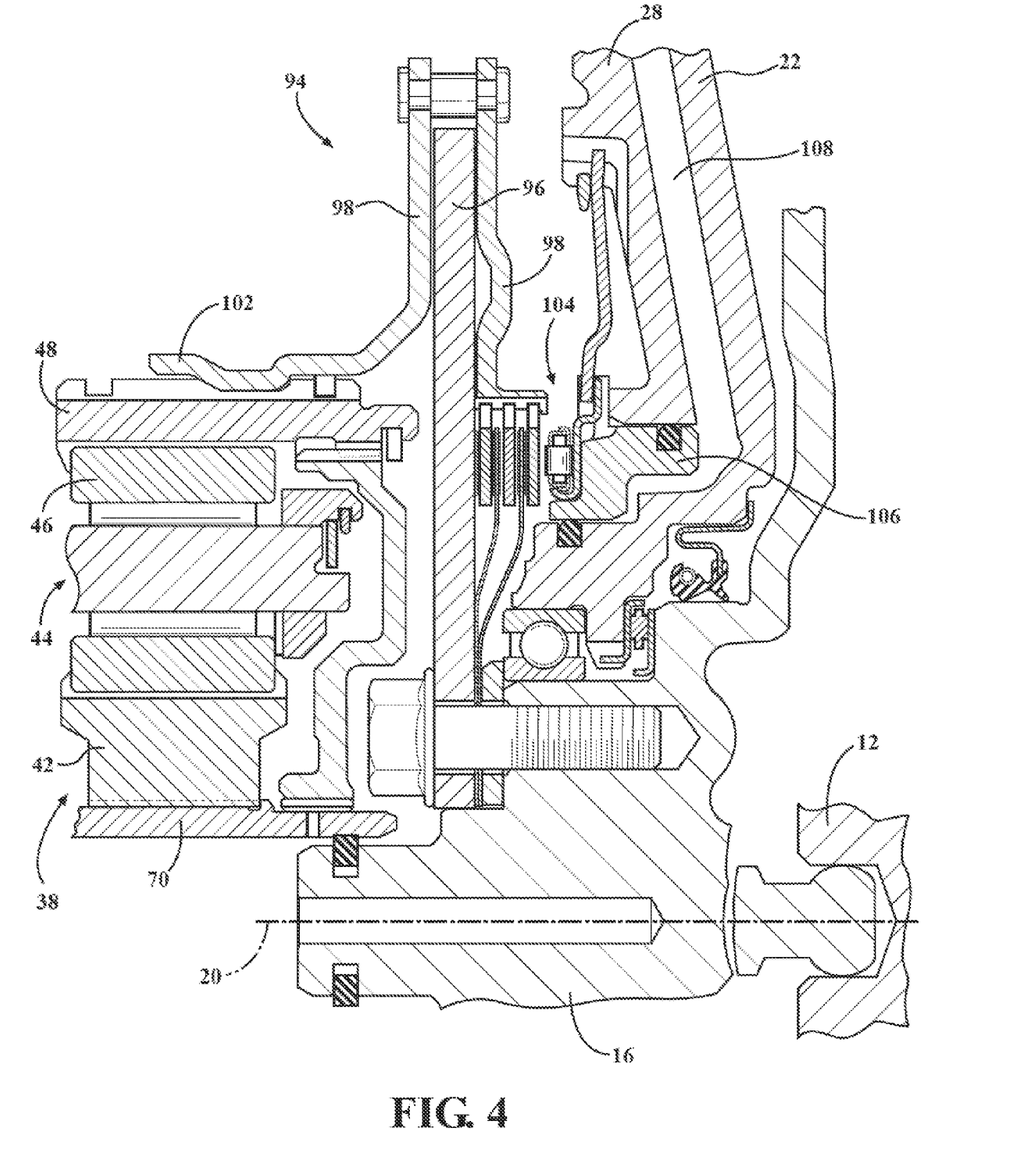
FIG. 4 is a schematic cross-sectional view of a damper mechanism including a flange of a cage engaging a ring gear of a first planetary gear set.

Continuing with FIG. 1, the cage 98 can include a flange 102 extending therefrom with the flange 102 coupled to the first planetary gear set 38. More specifically, in certain embodiments, the flange 102 engages the ring gear 48 of the first planetary gear set 38 as shown in FIG. 4. In other words, the flange 102 is directly coupled to the ring gear 48 of the first planetary gear set 38 (see FIG. 4). Therefore, the position of the flange 102 can change, but the flange 102 and the ring gear 48 of the first planetary gear set 38 align with each other transverse to the first axis 20.

Turning back to FIGS. 1 and 2, the transmission 14 can also include a torque-bypass mechanism 104 operatively coupled to the damper mechanism 94 such that actuation of the torque-bypass mechanism 104 provides common rotation of the plate 96 and the cage 98 about the first axis 20 with the input member 16. In other words, actuation of the torque-bypass mechanism 104 provides synchronized rotation of the plate 96 and the cage 98 about the first axis 20 with the input member 16 to start the engine 12 of the vehicle. Generally, the torque-bypass mechanism 104 is disposed between the second end wall 28 and the first planetary gear set 38 along the first axis 20. More specifically, the torque-bypass mechanism 104 is disposed between the second end wall 28 and the plate 96 of the damper mechanism 94 along the first axis 20. Furthermore, the torque-bypass mechanism 104 is supported by the second end wall 28. The torque-bypass mechanism 104 can further be defined as a bypass clutch.

The torque-bypass mechanism 104 can include a piston 106 movable between an initial position and a final position along the first axis 20, with the piston 106 continuously biased to the initial position. The second end wall 28 defines a passageway 108 for supplying or guiding fluid to the back of the piston 106 to move the piston 106 to the final position. When the piston 106 is in the initial position, the piston 106 is spaced from the damper mechanism 94 such that relative movement between the plate 96 and the cage 98 about the first axis 20 is allowed when the engine 12 is running. Therefore, the cage 98 is disconnected from the plate 96 when the piston 106 is in the initial position to allow relative movement between the plate 96 and the cage 98, and thus the input member 16 does not start the engine 12. When the piston 106 is in the final position, the piston 106 engages the damper mechanism 94 to connect the cage 98 and the plate 96 to provide synchronized movement of the cage 98 and the plate 96 with the input member 16 to start the engine 12. In other words, when the piston 106 engages the damper mechanism 94, the cage 98 and the plate 96 commonly rotate about the first axis 20.

Optionally, as shown in FIG. 1, the transmission 14 can include a torque-brake mechanism 110 attached to the casing 22 and coupled to the input member 16. More specifically, the torque-brake mechanism 110 is attached to the casing 22 and coupled to the cage 98 of the damper mechanism 94. Therefore, the torque-brake mechanism 110 is coupled to the input member 16 through the damper mechanism 94. The torque-brake mechanism 110 allows rotation of the input member 16 in a first direction about the first axis 20 and prevents rotation of the input member 16 in a second direction opposite the first direction. Furthermore, utilizing the torque-brake mechanism 110 enables both the first and second motor/generators 50, 52 to power the vehicle. In addition, utilizing the torque-brake mechanism 110 enables more efficient electric vehicle driving by reducing battery size, which also reduces cost.

The first direction can be clockwise or counter-clockwise. Therefore, the second direction can be clockwise or counter-clockwise depending on the first direction. For example, if the first direction is clockwise then the second direction is counter-clockwise. As another example, if the first direction is counter-clockwise then the second direction is clockwise. Generally, the torque-brake mechanism 110 is disposed between the damper mechanism 94 and the second motor/generator 52 along the first axis 20. More specifically, the torque-brake mechanism 110 is disposed between the plate 96 of the damper mechanism 94 and the second motor/generator 52 along the first axis 20. The torque-brake mechanism 110 can be further defined as a brake clutch. It is to be appreciated that the torque-brake mechanism 110 can be commonly referred to as a one-way clutch.

Continuing with FIG. 1, the torque-brake mechanism 110 includes a first portion 112 attached to the casing 22 to secure the torque-brake mechanism 110 thereto and a second portion 114 coupled to the damper mechanism 94 such that the second portion 114 and a portion of the damper mechanism 94 commonly rotate about the first axis 20 independently of the first portion 112. The second portion 114 is also coupled to the first portion 112 and is rotatable relative to the first portion 112. Therefore, the first portion 112 remains stationary as the second portion 114 rotates with the portion of the damper mechanism 94. The portion of the damper mechanism 94 is further defined as the cage 98, with the second portion 114 coupled to the cage 98 such that the second portion 114 and the cage 98 commonly rotate about the first axis 20 independently of the first portion 112. More specifically, the portion of the damper mechanism 94 is further defined as the flange 102 of the cage 98 and the cage 98.

As shown in FIG. 1, the second portion 114 engages the flange 102 of the cage 98. The second portion 114 can be splined to the cage 98, and more specifically splined to the flange 102, or coupled to the cage 98 by any suitable methods. The torque-brake mechanism 110, and more specifically the first and second portions 112, 114, is disposed between the flange 102 of the cage 98 and the casing 22 transverse to the first axis 20. Therefore, the torque-brake mechanism 110, the flange 102, and the ring gear 48 of the first planetary gear set 38 align with each other transverse to the first axis 20.

Continuing with FIG. 1, optionally, the transmission 14 can include a torque-limiter mechanism 116 coupled to the input member 16 and the ring gear 48 of the first planetary gear set 38. More specifically, the torque-limiter mechanism 116 is coupled to the input member 16 through the damper mechanism 94. The torque-limiter mechanism 116 allows the ring gear 48 of the first planetary gear set 38 and the input member 16 to commonly rotate about the first axis 20 in a first condition and allows the ring gear 48 of the first planetary gear set 38 and the input member 16 to rotate independently of each other about the first axis 20 in a second condition. Generally, the torque-limiter mechanism 116 is disposed between the damper mechanism 94 and the second motor/generator 52 along the first axis 20. More specifically, the torque-limiter mechanism 116 is disposed between the plate 96 of the damper mechanism 94 and the second motor/generator 52 along the first axis 20. Furthermore, as shown in FIG. 1, the torque-limiter mechanism 116 is disposed between the torque-brake mechanism 110 and the ring gear 48 of the first planetary gear set 38 transverse to the first axis 20. More specifically, the torque-limiter mechanism 116 is disposed between the flange 102 of the cage 98 and the ring gear 48 of the first planetary gear set 38 transverse to the first axis 20. Therefore, the torque-limiter mechanism 116, the torque-brake mechanism 110, the flange 102, and the ring gear 48 of the first planetary gear set 38 align with each other transverse to the first axis 20. The torque-limiter mechanism 116 can be further defined as a torque-limiter clutch.

The torque-limiter mechanism 116 can include a plurality of first plates 118 coupled to the ring gear 48 of the first planetary gear set 38 and a plurality of second plates 120 coupled to the cage 98. More specifically, the second plates 120 can be coupled to the flange 102 of the cage 98. Generally, the first plates 118 are splined to the ring gear 48 of the first planetary gear set 38 and the second plates 120 are splined to the flange 102. It is to be appreciated that the first plates 118 can be coupled to the ring gear 48 of the first planetary gear set 38 by any suitable methods. It is to also be appreciated that the second plates 120 can be coupled to the cage 98, and more specifically the flange 102, by any suitable methods.

The torque-limiter mechanism 116 can also include a biasing member 122 applying a force to the first and second plates 118, 120 such that the torque-limiter mechanism 116 commonly rotates with the ring gear 48 of the first planetary gear set 38 and the cage 98 of the damper mechanism 94 in the first condition. Generally, the first condition occurs under operation of the vehicle without encountering any spike in torque due to road conditions, etc. and the second condition occurs under operation of the vehicle when encountering a spike in torque due to the road conditions, etc. For example, the second condition can be when slippage occurs between at least one wheel or tire of the vehicle and the road during operation of the vehicle. Therefore, when the wheel/tire grips the road, the wheel/tire stops slipping and a spike in torque occurs in the transmission 14. The force applied to the first and second plates 118, 120 of the torque-limiter mechanism 116 is overcome in the second condition such that the first and second plates 118, 120 rotate independently of each other. Allowing the first and second plates 118, 120 to rotate independently of each other when a spike in torque occurs minimizes non-functioning of various components of the vehicle.

As suggested above and as best shown in FIG. 4, both the torque-brake mechanism 110 and the torque-limiter mechanism 116 can be eliminated such that the flange 102 of the cage 98 is directly coupled to the ring gear 48 of the first planetary gear set 38. Even though FIG. 4 does not illustrate the entire schematic cross-section of the powertrain 10 discussed herein, it is to be appreciated that the powertrain 10 discussed herein is applicable to FIG. 4 and the difference between FIGS. 1 and 4 is the elimination of the torque-brake mechanism 110 and the torque-limiter mechanism 116 in FIG. 4 such that the flange 102 of the cage 98 is directly coupled to the ring gear 48 of the first planetary gear set 38. It is to be appreciated that the torque-brake mechanism 110 can be utilized without the torque-limiter mechanism 116, and furthermore, the torque-limiter mechanism 116 can be utilized without the torque-brake mechanism 110. When the torque-brake mechanism 110 is utilized without the torque-limiter mechanism 116, the cage 98, and more specifically the flange 102, is directly coupled to the ring gear 48 of the first planetary gear set 38.

Turning back to FIGS. 1 and 2, the drive transfer assembly 36 transfers torque from the transmission 14 to the wheels of the vehicle. Therefore, the drive transfer assembly 36 transfers torque to wheel axles 124, and thus to the wheels.

The drive transfer assembly 36 can include a drive member 126 connected to the output member 18 for rotation with the drive member 126. More specifically, the drive member 126 is attached to the output member 18 such that the drive member 126 and the output member 18 commonly rotate about the first axis 20. As such, the output member 18 drives the drive transfer assembly 36 to transfer torque to the wheel axles 124, and thus the wheels. Generally, the drive member 126 is disposed between the second motor/generator 52 and the first planetary gear set 38 along the first axis 20. More specifically, the drive member 126 is disposed between the resolver 58 of the second motor/generator 52 and the first planetary gear set 38 along the first axis 20. Furthermore, the first planetary gear set 38 is disposed between the damper mechanism 94 and the drive member 126 along the first axis 20, and more specifically, the first planetary gear set 38 is disposed between the plate 96 of the damper mechanism 94 and the drive member 126 along the first axis 20. In addition, the second motor/generator 52 is disposed between the drive member 126 and the second planetary gear set 40 along the first axis 20. The second support 78, as discussed above, can further include a lip 128 extending along the first axis 20, with the drive member 126 supported by the lip 128 of the second support 78.

The drive transfer assembly 36 can also include a driven member 130 and a gearing arrangement 132 operatively connected to each other about a second axis 134. Generally, in certain embodiments, the first and second axes 20, 134 are substantially parallel to each other. The drive member 126 and the driven member 130 substantially align with each other transverse to the first and second axes 20, 134.

The gearing arrangement 132 includes a sun gear 136, a carrier 138 rotatably supporting a plurality of pinion gears 140, and a ring gear 142. The pinion gears 140 mesh with the sun gear 136 and the ring gear 142 of the gearing arrangement 132. In other words, the gearing arrangement 132 includes a planetary gear set. The sun gear 136 of the gearing arrangement 132 is connected for rotation with the driven member 130 and the ring gear 142 of the gearing arrangement 132 is grounded to the casing 22.

The drive transfer assembly 36 can further include an endless torque-transfer device 144 operatively connecting the drive member 126 to the driven member 130. The endless torque-transfer device 144 transfers torque from the drive member 126 to the driven member 130. The endless torque-transfer device 144 at least partially surrounds the gearing arrangement 132.

The drive member 126 and the driven member 130 can each be a sprocket. Furthermore, the endless torque-transfer device 144 can be a chain cooperating with the sprockets. Therefore, the chain connects the sprocket of the drive member 126 with the sprocket of the driven member 130 to transfer torque from the drive member 126 to the driven member 130. It is to be appreciated that the drive member 126 and the driven member 130 can be components other than a sprocket. It is to also be appreciated that the endless torque-transfer device 144 can be a component other than a chain.

Continuing with FIGS. 1 and 2, the transmission 14 can also include a differential 146 operatively connected to the gearing arrangement 132 about the second axis 134. Generally, the gearing arrangement 132 is disposed between the driven member 130 and the differential 146 along the second axis 134.

The differential 146 can include various components, such as a carrier 148 rotatably supporting a plurality of pinion gears 150, side gears 152 connected for common rotation with respective wheel axles 124, etc., the details of which will not be discussed further. Generally, as discussed above, the gearing arrangement 132 is disposed between the driven member 130 and the differential 146 along the second axis 134. More specifically, the gearing arrangement 132 is disposed between the driven member 130 and the carrier 148 of the differential 146 along the second axis 134.

Furthermore, the driven member 130, the gearing arrangement 132 and the differential 146 are operable about the second axis 134. Therefore, the driven member 130 is operatively connected to the gearing arrangement 132, the differential 146 and the wheel axles 124 to deliver torque to the wheels of the vehicle. Specifically, the transmission 14 is configured to transfer torque from the first axis 20, partially defined by the input member 16 and the output member 18, to the second axis 134, partially defined by the wheel axles 124, via the drive member 126, the driven member 130, and the endless torque-transfer device 144.

The transmission arrangement discussed above maximizes packaging space of the components of the transmission 14, as well as optimizes the configuration of the casing 22 of the transmission 14 being packaged in the vehicle. In other words, by maximizing packaging space of the components of the transmission 14, the size of the casing 22 can be reduced. This transmission arrangement also simplifies assembly of the components in the transmission 14. Therefore, this transmission arrangement enhances performance and manufacturability of the transmission 14 while decreasing mass of the transmission 14 and thus reducing costs. Furthermore, reducing mass of the transmission 14 improves fuel economy of the vehicle.

It is to be appreciated that FIG. 2 is a schematic illustrating various components of the transmission 14 above the first axis 20 and those skilled in the art will recognize that the first and second planetary gear sets 38, 40, the first and second torque-transmitting mechanisms 80, 86, the damper mechanism 94, the torque-bypass mechanism 104 and various other components are generally symmetrical about the first axis 20.

While the best modes for carrying out the disclosure have been described in detail, those familiar with the art to which this disclosure relates will recognize various alternative designs and embodiments for practicing the disclosure within the scope of the appended claims.

The invention claimed is:

1. An electrically-variable transmission for a vehicle, the transmission comprising:
    an input member and an output member each rotatable about a first axis;
    a casing including a side wall cooperating with a first end wall and a second end wall to define a cavity enclosed by the side wall and the first and second end walls, with the first and second end walls spaced from each other along the first axis and the side wall spaced radially away from the first axis;
    a first planetary gear set and a second planetary gear set each disposed in the cavity, and each having a sun gear, a carrier rotatably supporting a plurality of pinion gears, and a ring gear, with the pinion gears of the first planetary gear set meshing with the sun gear and the ring gear of the first planetary gear set, and the pinion gears of the second planetary gear set meshing with the sun gear and the ring gear of the second planetary gear set;
    a first motor/generator and a second motor/generator disposed in the cavity and spaced from each other along the first axis such that the second planetary gear set is disposed between the first and second motor/generators along the first axis, with the first motor/generator connected for rotation with the sun gear of the first planetary gear set and the second motor/generator connected for rotation with the sun gear of the second planetary gear set;
    a first support disposed inside the cavity of the casing and attached to the casing from inside the cavity, with the first motor/generator secured to the first support such that the first support supports the first motor/generator;
    a first torque-transmitting mechanism disposed in the cavity and selectively actuated to ground the ring gear of the second planetary gear set to the casing, with the first torque-transmitting mechanism disposed between the first and second motor/generators along the first axis;
    a second torque-transmitting mechanism disposed in the cavity and selectively actuated to connect the sun gear of the first planetary gear set with the ring gear of the second planetary gear set, with the second torque-transmitting mechanism disposed between the first end wall and the first motor/generator along the first axis, and with the first motor/generator disposed between the first and second torque-transmitting mechanisms along the first axis; and
    a damper mechanism coupled to the input member and the first planetary gear set in the cavity, with the damper mechanism disposed between the second end wall and the first planetary gear set along the first axis.

2. The transmission as set forth in claim 1 wherein the damper mechanism includes a plate attached to the input member and a cage disposed about the plate, with the cage coupled to the plate and the ring gear of the first planetary gear set.

3. The transmission as set forth in claim 2 further including a torque-bypass mechanism operatively coupled to the damper mechanism such that actuation of the torque-bypass mechanism provides common rotation of the plate and the cage about the first axis with the input member, and wherein the torque-bypass mechanism is disposed between the second end wall and the first planetary gear set along the first axis.

4. The transmission as set forth in claim 3 wherein the torque-bypass mechanism is disposed between the second end wall and the plate of the damper mechanism along the first axis.

5. The transmission as set forth in claim 1 further including a torque-brake mechanism attached to the casing and coupled to the input member, with the torque-brake mechanism allowing rotation of the input member in a first direction about the first axis and preventing rotation of the input member in a second direction opposite the first direction, with the torque-brake mechanism disposed between the damper mechanism and the second motor/generator along the first axis.

6. The transmission as set forth in claim 5 wherein the torque-brake mechanism includes a first portion attached to the casing to secure the torque-brake mechanism thereto and a second portion coupled to the damper mechanism such that the second portion and a portion of the damper mechanism commonly rotate about the first axis independently of the first portion.

7. The transmission as set forth in claim 6 wherein the damper mechanism includes a plate attached to the input member and a cage disposed about the plate, with the cage coupled to the plate and the ring gear of the first planetary gear set, and wherein the portion of the damper mechanism is further defined as the cage, with the second portion of the torque-brake mechanism coupled to the cage such that the second portion and the cage commonly rotate about the first axis independently of the first portion of the torque-brake mechanism.

8. The transmission as set forth in claim 1 further including a torque-limiter mechanism coupled to the input member and the ring gear of the first planetary gear set, with the torque-limiter mechanism allowing the ring gear of the first planetary gear set and the input member to commonly rotate about the first axis in a first condition and allowing the ring gear of the first planetary gear set and the input member to rotate independently of each other about the first axis in a second condition, and wherein the torque-limiter mechanism is disposed between the damper mechanism and the second motor/generator along the first axis.

9. The transmission as set forth in claim 8 wherein the damper mechanism includes a plate attached to the input member and a cage disposed about the plate and coupled to the plate, and wherein the torque-limiter mechanism includes a plurality of first plates coupled to the ring gear of the first planetary gear set and a plurality of second plates coupled to the cage, with the torque-limiter mechanism including a biasing member applying a force to the first and second plates such that the torque-limiter mechanism commonly rotates with the ring gear of the first planetary gear set and the cage of the damper mechanism in the first condition, and wherein the force being applied by the biasing member is overcome in the second condition such that the first and second plates rotate independently of each other.

10. The transmission as set forth in claim 9 further including a torque-brake mechanism attached to the casing and coupled to the cage of the damper mechanism, with the torque-brake mechanism allowing rotation of the input member in a first direction about the first axis and preventing rotation of the input member in a second direction opposite the first direction, with the torque-brake mechanism disposed between the damper mechanism and the second motor/generator along the first axis, and the torque-limiter mechanism disposed between the torque-brake mechanism and the ring gear of the first planetary gear set transverse to the first axis.

11. The transmission as set forth in claim 1 further including a drive member connected to the output member for rotation with the drive member, with the drive member disposed between the second motor/generator and the first planetary gear set along the first axis.

12. The transmission as set forth in claim 11 further including a driven member and a gearing arrangement operatively connected to each other about a second axis, with the first and second axes substantially parallel to each other, and with the drive member and the driven member substantially aligning with each other transverse to the first and second axes.

13. The transmission as set forth in claim 12 wherein the gearing arrangement includes a sun gear, a carrier rotatably supporting a plurality of pinion gears, and a ring gear, with the sun gear of the gearing arrangement connected for rotation with the driven member, and the ring gear of the gearing arrangement grounded to the casing.

14. The transmission as set forth in claim 12 further including a differential operatively connected to the gearing arrangement about the second axis, and wherein the gearing arrangement is disposed between the driven member and the differential along the second axis.

15. The transmission as set forth in claim 1 wherein the first torque-transmitting mechanism is coupled to the first support, and wherein selectively actuating the first torque-transmitting mechanism to ground the ring gear of the second planetary gear set to the casing is further defined as selectively grounding the ring gear of the second planetary gear set to the casing through the first support.

16. The transmission as set forth in claim 1 further including a second support attached to the first support inside the cavity of the casing, with the second motor/generator secured to the second support such that the second support supports the second motor/generator.

17. The transmission as set forth in claim 16 wherein the second support includes a lip extending along the first axis, and further including a drive member connected to the output member for rotation with the drive member, with the drive member supported by the lip of the second support, and with the drive member disposed between the second motor/generator and the first planetary gear set along the first axis.

18. The transmission as set forth in claim 1 wherein the first torque-transmitting mechanism is disposed radially outward of the second planetary gear set relative to the first axis, and wherein the second motor/generator is disposed between the first and second planetary gear sets along the first axis.

19. An electrically-variable transmission for a vehicle, the transmission comprising:

an input member and an output member each rotatable about a first axis;

a casing including a side wall cooperating with a first end wall and a second end wall to define a cavity enclosed by the side wall and the first and second end walls, with the first and second end walls spaced from each other along the first axis and the side wall spaced radially away from the first axis;

a first planetary gear set and a second planetary gear set each disposed in the cavity, and each having a sun gear, a carrier rotatably supporting a plurality of pinion gears, and a ring gear, with the pinion gears of the first planetary gear set meshing with the sun gear and the ring gear of the first planetary gear set, and the pinion gears of the second planetary gear set meshing with the sun gear and the ring gear of the second planetary gear set;

a first motor/generator and a second motor/generator disposed in the cavity and spaced from each other along the first axis such that the second planetary gear set is disposed between the first and second motor/generators along the first axis, with the first motor/generator connected for rotation with the sun gear of the first planetary gear set and the second motor/generator connected for rotation with the sun gear of the second planetary gear set;

wherein the first and second motor/generators each include a rotor, a stator and a resolver, with the stator of the first and second motor/generators each grounded to the casing;

a first support disposed inside the cavity of the casing and attached to the casing from inside the cavity, with the first motor/generator secured to the first support such that the first support supports the first motor/generator a first torque-transmitting mechanism disposed in the cavity and selectively actuated to ground the ring gear of the second planetary gear set to the casing, with the first torque-transmitting mechanism disposed between the first and second motor/generators along the first axis;

a second torque-transmitting mechanism disposed in the cavity and selectively actuated to connect the sun gear of the first planetary gear set with the ring gear of the second planetary gear set, with the second torque-transmitting mechanism disposed between the first end wall and the first motor/generator along the first axis, and with the first motor/generator disposed between the first and second torque-transmitting mechanisms along the first axis; and a damper mechanism coupled to the input member and the first planetary gear set in the cavity, with the damper mechanism disposed between the second end wall and the first planetary gear set along the first axis.

* * * * *